(12) United States Patent
Payack

(10) Patent No.: US 11,040,295 B2
(45) Date of Patent: Jun. 22, 2021

(54) METHOD AND APPARATUS FOR EXTRACTING PLANT OILS USING ETHANOL WATER

(71) Applicant: Joseph Francis Payack, Somerset, NJ (US)

(72) Inventor: Joseph Francis Payack, Somerset, NJ (US)

(\*) Notice: Subject to any disclaimer, the term of this patent is extended or adjusted under 35 U.S.C. 154(b) by 373 days.

(21) Appl. No.: 14/711,030

(22) Filed: May 13, 2015

(65) Prior Publication Data

US 2016/0228787 A1   Aug. 11, 2016

Related U.S. Application Data

(60) Provisional application No. 62/113,079, filed on Feb. 6, 2015.

(51) Int. Cl.
| | |
|---|---|
| *B01D 3/10* | (2006.01) |
| *C11B 1/10* | (2006.01) |
| *B01D 3/34* | (2006.01) |
| *B01D 3/36* | (2006.01) |
| *B01D 11/00* | (2006.01) |
| *B01D 11/02* | (2006.01) |
| *C11B 3/12* | (2006.01) |
| *A23D 9/04* | (2006.01) |

(52) U.S. Cl.
CPC ............. *B01D 3/10* (2013.01); *A23D 9/04* (2013.01); *B01D 3/343* (2013.01); *B01D 3/36* (2013.01); *B01D 11/00* (2013.01); *B01D 11/028* (2013.01); *B01D 11/0296* (2013.01); *C11B 1/10* (2013.01); *C11B 1/108* (2013.01); *C11B 3/12* (2013.01)

(58) Field of Classification Search
CPC .. C11B 1/10; C11B 1/108; B01D 3/10; B01D 3/343; B01D 3/36; B01D 11/00; B01D 11/028
See application file for complete search history.

(56) References Cited

U.S. PATENT DOCUMENTS

| | | | |
|---|---|---|---|
| 6,818,239 B2 | 11/2004 | Kagan | |
| 8,337,908 B2 | 12/2012 | Letzel | |
| 2004/0147767 A1\* | 7/2004 | Whittle | B01D 11/0242 549/390 |
| 2008/0128260 A1\* | 6/2008 | Balass | B01D 5/0012 202/176 |

(Continued)

FOREIGN PATENT DOCUMENTS

| | | |
|---|---|---|
| GB | EP1385595 | 4/2004 |
| GB | EP1803717 | 5/2010 |

OTHER PUBLICATIONS

"Laboratory 6.2: Distillation: Purify Ethanol". Available online at https://makezine.com/laboratory-62-distillation-purify-e/ on Aug. 24, 2009.\*

(Continued)

*Primary Examiner* — Erik Kashnikow
*Assistant Examiner* — Assaf Zilbering
(74) *Attorney, Agent, or Firm* — Law Office of Darius Gleason APC

(57) ABSTRACT

The invention provides a method and apparatus for continuous extraction of plant oils from plant tissue using an advantageous azeotrope of ethanol and water and employing the differing solubility of plant oils in ethanol and water to drive formation of a non-toxic oil tincture.

7 Claims, 2 Drawing Sheets

(56) References Cited

U.S. PATENT DOCUMENTS

2013/0079531 A1* 3/2013 Barringer ............. C07D 311/78
549/390
2014/0163247 A1* 6/2014 Buese ................ B01D 11/0284
554/8

OTHER PUBLICATIONS

"Rotary Evaporators—Cannabis Concentrates—International Cannagraphic Magazine Forums" Available online at www.icmag.com/is/showthread.php?t=287247 on Jun. 9, 2014.*

"Training Manual on Extraction Technology of Natural Dye & Aroma Therapy and Cultivation Vluae Addition of Medicinal Plants" Available on Nov. 2, 2011.*

"Guide to using medical cannabis". Available online at www.safeaccessnow.org/using_medical_cannabis on Sep. 18, 2013.*

Corral, "Milagro Oil Extract for the treatment of cancer and reduction of associated symptoms". Available online at https://www.wamm.org/wp-content/uploads/2012/04/Milagro-Treatment.pdf (Year: 2012).*

Gold, "High-Volume Extraction Method". Available online at http://www.kindgreenbuds.com/cannabis-alchemy/high-volume-extraction-method/ (Year: 2005).*

Handa et al., "Extraction Technologies for Medicinal and Aromatic Plants". Available online at https://www.unido.org/sites/default/files/2009-10/Extraction_technologies_for_medicinal_and_aromatic_plants_0.pdf (Year: 2008).*

Durling, "Extraction of phenolics and essential oil from dried sage (*Salvia officinalis*) using ethanol-water mixtures", Food Chemistry vol. 101, Issue 4, 2007, pp. 1417-1424, USA.

* cited by examiner

METHOD AND APPARATUS FOR EXTRACTING PLANT OILS USING ETHANOL WATER

FIELD OF INVENTION

Plant oil is extracted from numerous commercially significant plants including rapeseed, soy, sunflower, and olive among many others. The cannabis plant is also an oil bearing plant of economic significance. *Cannabis* has been legalized in 23 states for medical purposes and in 3 states for recreational purposes. Smoking the cannabis flower is the most common method of consuming the drug. An increasingly prevalent alternative to smoking *cannabis* is consuming *cannabis* extracts containing concentrated cannabinoids (CBNs). CBNs can be consumed in the form of edibles, sublingual drops, as body lotions, and by vapor inhalation.

BACKGROUND OF THE INVENTION

*Cannabis* is an annual herb that is generally thought to include two species, sativa and indica (Hillig et al. 2004). Only female plants give rise to the CBN rich flowers and CBN content is highly variable among strains (van Bakel et al. 2011). *Cannabis* has a diploid genome approximately 820 Mb in size with a chromosome complement of 2n=20 (Hillig et al. 2004). The karyotype is composed of nine autosomes and two sex chromosomes (van Bakel et al. 2011). *Cannabis sativa* is the species commonly known as "Hemp" which is mass produced for materials and food. However some sativa cultivars have been bred for high CBN content and are suitable for medical use. *Cannabis indica* and hybrids thereof are the most commonly used cultivars for medical and recreational use (Lamarck 1785).

Medical Uses

*Cannabis* has been used medicinally for thousands of years (Abel 1980). It has been used to treat many ailments, including but not limited to insomnia, headaches and migraine pain, menstruation pain, muscle pain, cramps and spasms. *Cannabis* has benefits for chemotherapy patients and for AIDS patients by inhibiting wasting syndrome, nausea and vomiting (Abrahamov et al. 1995, Haney et al. 2007). *Cannabis* has long been prescribed to Glaucoma patients for lowering intra-ocular pressure (Helper et al. 1971). *Cannabis* has also been used beneficially by patients with seizure and epilepsy (Maa et al. 2014). Some new medical findings indicate that cannabinoids may have anti-oncogenic properties (Massi et al. 2013, Romano et al. 2014, Scott et al. 2014). CBNs have also been reported to stimulate neurogenesis (Alline et al. 2013, Xapelli et al. 2013, Jiang et al. 2005).

The safety of *Cannabis* is well documented. For example smoking one cannabis cigarette per day for up to 20 years had no significant effect on lung function (Kempker et al. 2015). It has also been found that while tobacco smokers experience a 50% increase in bladder cancer after 10 years of consumption, cannabis users had a 45% reduction in the incidence (Thomas et al. 2015). *Cannabis* is many times less toxic than virtually all other commonly consumed psychoactive compounds, with a fatal toxic overdose being nearly impossible; in stark contrast with other drugs such as alcohol, nicotine, heroin, and cocaine (Lachenmeier et al. 2015).

Administration

Smoking *cannabis* flowers is the most common method of consuming the drug among both recreational and medical users. The high lipid-solubility of CBNs allows them to cross from the lung mucous membrane into the blood rapidly, thereby also enabling rapid delivery to the brain. However, smoking as a method of drug administration suffers from the inherent dangers of smoking. Oral administration, an increasingly popular alternative due to higher quality food products, results in a slow, lipid-dependent absorption across the stomach lining into blood. Once absorbed it often carries a long-lasting effect. Topical administration in the form of body lotion, sublingual drops, or drops in the mucous membranes of the eyes or nose is also a popular alternative. Intravenous injection or infusion of CBNs is less practical because they are insoluble in water. Vapor inhalation has become a very popular alternative for delivering CBNs in a controlled fashion. Vaporization takes advantage of the fact that the heat of vaporization for CBNs is far lower than the pyrolysis temperature of *Cannabis* flower tissue. Thus the active ingredients can be released and inhaled without any combustion or burning of the plant tissue.

Cannabinoids

CBNs are a diverse family of 21-carbon, terpenophenolic compounds that includes hundreds if not thousands of members (Hillig et al. 2004). CBNs were first identified in plants, the phytocannabinoids, but are now known to also exist in vertebrates as the endocannabinoids. The most well-known CBN, is $\Delta^9$—Tetrahydrocannabinol (THC). THC was first isolated in 1964 by Mechoulam (Gaoni et al. 1964). THC constitutes between 11 and 23% of the dry weight of flower (van Bakel et al. 2011). THC is derived from tetrahydrocannabinolic acid (THCA), the carboxylic acid precursor which becomes THC upon heating or drying of the plant tissue. THCA is the predominant form of THC in fresh flower tissue, See, e.g., U.S. Pat. No. 8,846,409. THC is the primary psychoactive component of the *Cannabis* plant and is responsible for the analgesic, antiemetic and appetite-stimulating effects of *cannabis* (van Bakel et al. 2011). THC is available as a pharmaceutical drug under the name Marinol or Dronabil. THC mimics the action of anandamide, the primary endocannabinoid produced naturally in the body by binding to cannabinoid receptors (Glass et al. 1997). The CB1 receptor is expressed mainly in the brain (central nervous system or "CNS") but in other tissue as well (Tomida et al. 2004). The CB2 receptor is expressed mainly in the immune system and in hematopoietic cells (Tomida et al. 2004). THC has been found to be neuroprotective by reducing neuro-inflammation (van der Stelt et al. 2001). THC has also been found to have potential for treating Alzheimer's Disease (Eubanks et al. 2006) Closely related to $\Delta^9$THC is the double bond isomer $\Delta^8$—Tetrahydrocannabinol. $\Delta^8$THC is found in smaller quantities in most *cannabis* plants and is thought to be at least 50% less potent than $\Delta^9$THC.

Another well-known CBN is the non-psychoactive Cannabidiol (CBD). CBD is the main cannabinoid in low-THC *Cannabis* strains and has gained recognition for its effective treatment of childhood epilepsy (Maa et al. 2014). CBD also has a carboxylic acid precursor called cannabidiolate (CBDA). CBDA is similarly the most prevent CBD in fresh flower tissue and becomes CBD upon heating, or drying of the plant tissue See, e.g., U.S. Pat. No. 8,846,409. CBD has also been shown to be effective in treating a range of other conditions including neuropathic pain (Barnes 2006), multiple sclerosis (Perras 2005), and more recently cancer (Massi et al. 2013, Romano et al. 2014, Scott et al. 2014). Not surprisingly, CBD has become the target of considerable clinical development and is available commercially from GW Pharma Inc. as Sativex.

A third CBN of interest is the non-psychoactive Cannabichromene (CBC) (Gaoni et al. 1966). CBC is the second most abundant phytocannabinoid in *Cannabis* (Turner et al. 1981, Brown et al. 1990). CBC has anti-inflammatory activity and some anti-bacterial activity (Turner et al. 1981). CBC has been reported to stimulate neurogenesis (Shinjyo et al. 2013). CBC also has a carboxylic acid precursor more prevalent in fresh tissue, cannabichromenate (CBCA).

THC, CBD and CBC, and their carboxylic acid precursors are all derived from a common precursor Cannabigerol (CBG) and its carboxylic acid precursor cannabigerolate (CBGA) (Hillig et al. 2004). Parallel to THC, CBD and CBC are second family of CBNs are derived from cannabigerovarin (CBGV). CBGV gives rise to $\Delta^9$-tetrahadryocannabivarin (THCV), cannabidivarin (CBDV), and cannbivarichromene (CBCV) (Hilling et al. 2004). In most cases THC, CBD and CBC are present in greater quantities than THCV, CBDV, CBCV (Hilling et al. 2004). The two sets of CBNs are thought to have substantially parallel pharmaceutical activities, but CBDV is being developed by GW Pharmaceuticals Inc. for its anti-convulsive action (Amada et al. 2013). GW Pharmaceuticals Inc. is also developing THCV for its appetite suppressing effects. Numerous other CBNs remain to be identified and characterized.

The first endocannabinoid, or CBN made naturally in vertebrates, was found in 1992, arachidonoyl ethanolamine and named anandamide. (Martin 1992). The main endocannabiniods, anandamide and 2-AG, are derived in vivo by amidation or esterification of arachidonic acid with ethanolamine or glycerol. Thus, anandamide and 2-AG are long chain unsaturated hydrocarbons with a polar domain at one end. The plant derived cannabinoids are similarly non-polar hydrocarbons having one or two hydrogen bond donors. Although considered to be terpenes, in is useful to consider the phytocannabiniods as alkyl substituted bis-phenols. All known *cannabis* derived cannabinoids are based on a 2,5-dialkyl-1,3-benzenediol scaffold. The cannabidiol class maintains two hydrogen bond donating phenolic moieties, while the cannabinol class features one phenolic proton, whilst the other phenolic oxygen is cyclized to form a benzofuran or benzopyran ring. The various permutations of this ring closure leads to stereo and regio-isomers of differing oxidation states. The presence of this hydrogen bond donating ability in all known cannabinoids leads to excellent solubility in relatively polar solvents such as alcohols. The low toxicity, natural availability, and favorable physiochemical properties of ethanol make it perfectly suited for the current invention Methods of Extraction Several methods are known in the art for extracting and concentrating plant oil from plant tissue including: extraction with alcohols such as ethanol or methanol; extraction with liquid non-polar solvents comprising lower C4-C8 alkanes; supercritical carbon dioxide extraction; and extraction in food oils and butter. All methods in the prior art suffer from several problems including the fact that they are or can be quite dangerous, they are inefficient batch processes yielding only a single batch per run, and they all isolate unwanted materials along with the oil that must be removed in order to produce pure plant oil.

Traditionally, ethanol has been used to extract fragrances and oils from plant material resulting in tinctures. Ethanol extraction is achieved by commingling the oil bearing plant tissue with ethanol for a period of time sometimes with agitation or changes in temperature. Ethanol extraction has the advantage of leaving behind a larger fraction of non-polar waxes, fats and other generally hydrophobic substances known collectively as ballast. Ethanol is also an effective solvent because it extracts both acidic and basic constituents. By using higher alcoholic strengths and a more non-polar solution, lipid-soluble material like CBNs may be extracted. Unwanted ballast can be removed from the extract by an additional step referred to as "winterization": essentially cooling the extract to a temperature at which most remaining wax and lipid components precipitate out, typically −20° C. Although alcohol extracted tinctures contain less ballast than other methods they are still complex mixtures of plant constituents. Aside from being batch processes, and the risk of fire with using flammable alcohol, another limitation on traditional ethanol extraction is that ethanol is denaturing to some organic compounds.

Extraction of *Cannabis* tissue with non-polar solvents such as butane results in a product commonly referred to as: Butane Hash Oil (BHO), also known as wax. The extraction process involves pouring liquid butane through a tube filled with *cannabis* flower. CBNs are dissolved in liquid butane and as the butane exits the far end of the extraction tube it is collected and immediately begins to boil off. The extracted CBNs and other non-polar molecules are left behind to crystallize. Subsequent processing involves vacuum purging of the extract to remove butane trapped within the oil, a necessary safety precaution given butane's toxicity. The extract is a hardened or viscous mass of cannabinoids that also includes substantial ballast material composed of waxes, wax esters, glycerides, unsaturated fatty acid residues, terpenes, carotenes, other flavonoids See, e.g., U.S. Pat. No. 8,846,409. Other solvents commonly used are hexane and toluene. Aside from the high proportion of ballast this method collects, the main drawback to non-polar solvent extraction is the risk of fire. In an industrial setting, short chain hydrocarbons are avoided because of their low flash point, high electrostatic potential for self-ignition, and volatility. The lighter hydrocarbons are denser than air and will collect on the floor in a closed room. In addition, they have no odor and are difficult to detect. In the absence of adequate environment controls such as exhaust vents, and anti-static electricity measures the process is highly flammable and has often proven extremely dangerous.

Extraction of plant oil with super critical $CO_2$ is another method known in the art. Carbon dioxide at or above its critical temperature of 304.25 K and critical pressure 72.9 atm acts partially as a liquid and partially as a gas. In this state it will expand to fill its container like a gas but with the density of a liquid making it an effective solvent. Supercritical $CO_2$ extraction has low toxicity, is a low temperature process allowing compounds to be extracted with little degradation, and the solubility of many compounds in $CO_2$ varies with pressure thereby enabling selective extractions. The primary drawback of super critical $CO_2$ extraction is that it is quite dangerous. 72 atm is 72 times atmospheric pressure at sea level and therefore represents extremely high pressure. The use of such pressures in any laboratory or industrial apparatus presents a considerable risk of explosion resulting from structural failures due to the forces involved. To be safe the facility containing the lab must have engineering controls in place to minimize the danger to personnel. The process is also dangerous because $CO_2$ is odorless and can fill a room and asphyxiate personnel in a short period of time. Another drawback is that it extracts a high percentage of ballast consisting of fats, waxes, carbohydrates, proteins and sugars. The presence of these substances makes the extract hygroscopic and therefore difficult to reduce to a powder and a poor starting material for pharmaceutical preparations. Finally $CO_2$ extraction is inefficient. It is a batch process, limiting throughput, and generates a large amount of carbon dioxide gas as a byproduct. The spent $CO_2$ is then dumped into the environment as a pollutant, or laboriously recaptured and re-compressed for recycle.

Therefore a safe and efficient method for producing non-toxic plant oil of high purity and on scale is currently needed.

Relevant Art

WO2004/026857—Methods of purifying cannabinoids from plant material—provides methods for preparing a highly purified whole extract, wherein the cannabinoids are purified to greater than 95% chromatographic purity. The process generally involves optional decarboxylation by mild heating, extraction with liquid CO2, winterization to remove non-cannabinoids by precipitation in C1-C5 alcohol, optional treatment with charcoal, evaporation to produce a botanical drug.

WO 2004/026502—Method of preparing cannabidiol from plant material—provides methods for preparing a highly purified whole extract, wherein the cannabinoids are purified to greater than 95% chromatographic purity. The process generally involves optional decarboxylation by mild heating, extraction with liquid CO2, winterization to remove non-cannabinoids by precipitation in C1-C5 alcohol, optional treatment with charcoal, evaporation to produce a botanical drug substance with reduced amounts of, for example, monoterpenes, sesquiterpenes, hydrocarbons, alkaloids, flavonoids and chlorophylls.

WO 2013/165251 A1—*Cannabis* plant isolate comprising Δ-9-tetrahydrocannabinol and a method for preparing such an isolate—Discloses a composition and method for extracting *cannabis* with C5-C8 alkane, or with C1-C3 alcohol. The process optionally includes decarboxylation, and optional winterization. Evaporation of the solvent is achieved with a wiped film evaporator.

EP 1385595 B1—Processes for Preparing a Cannabinoid-Rich Extract From *Cannabis* Plant Material—Discloses a method of using super-heated gas solvent between 105 and 450C for a time sufficient to volatilize cannabinoids but without causing pyrolysis of the plant material. The resulting vapor is condensed.

US 2013/0079531—Process For the Rapid Extraction of Active Ingredients From Herbal Materials—Discloses a process and apparatus using cold solvent and agitation for rapid extraction of cannabinoids. Ethanol (ethyl alcohol) or ethanol 95%-water 5% is used as the extraction solvent. In order to minimize the extraction of chlorophyll and other undesired compounds, the solvent is kept cold—preferably below 0° C.—and contact between the herbal material and the solvent is ideally limited to a few minutes or less. The combined herbal material and solvent may be agitated during this period by the natural action of the setup employed, movement of the herbal material/solvent mixture through a feed auger, or by shaking or low-intensity ultrasound. The solvent is then evaporated.

EP 1803717—Production of Delta 9 Tetrahydrocannabinol—Discloses a process for extracting THC acid from plant material into an aqueous solvent under conditions of pH control. The acid is converted to a salt and the salt extracted into a polar solvent, yielding acid of high purity. The Δ9 THC acid is then converted to Δ9 THC which is further purified and combined with a carrier for pharmaceutical use. Allows for extraction away from cannabinol and cannabidiol, major contaminants of prior art preparations, which tend to exhibit the solubility profile of Δ9 THC.

US 2010/0216872—Plant Extract from Low-THC *Cannabis* for The Treatment Of Disease—Discloses a 24-48 hour process of extraction in a variety of solvents. During the preparation, the dried flowers and flower-proximal leaves are initially finely ground. The finely ground granules are subsequently introduced in a ratio of 1:4 to 1:5 (volume ratios) into various solvents and remain therein for 24 hours to 48 hours in light-proof brown bottles for the extraction procedure at room temperature, but not higher. The extract is subsequently filtered off and stored in light-proof bottles at approximately 2° C. Depending on the intended use, aqueous extracts using water or alcoholic extracts made of ethanol and isopropanol are suitable for the production of the extract.

US 2014/0248379 A1—Process for producing an extract containing tetrahydrocannabinol and cannabidiol from *cannabis* plant material, and *cannabis* extracts—discloses a carbon dioxide extraction.

US 2003/0017216 A1—Isolation of herbal and cannabinoid medicinal extracts—discloses a method of extracting *cannabis* using ethanol in a time sensitive manner.

U.S. Pat. No. 8,445,034 B1—Systems and methods for producing organic *cannabis* tincture—discloses a Soxhlet extraction system for *cannabis*.

US 2004/0143126A1—Methods of converting cannabidiol to Delta 8 or Delta 9-tetrahydrocannabinol by mixing the diol with a catalyst and solvent and allowing the mixture to separate, removing the organic phase; and eluting the tetrahydrocannbinol from the organic phase.

REFERENCES CITED

Hillig, K. W., et al., "A Chemotaxonomic Analysis of Cannabinoid Variation in *Cannabis* (Cannabaceae)," American Journal of Botany 91(6): 966-975. 2004.

Van Bakel et al., "The draft genome and transcriptome of *Cannabis sativa*" Genome Biology 2011, 12:R102.

Lamarck, J. B., "Encyclopedique methodique, Botanique I (part 2): 694-695. Panckoucke, Paris, France.

Abel, E. L. "Marihuana. The first twelve thousand years." Plenum Press, New York, N.Y. USA. 1980.

Abrahamov A. et al., "An efficient new cannabinoid antiemetic in pediatric oncology." Life Sci. 1995; 56(23-24):2097-102.

Maa, E., et al., "The case for medical marijuana in epilepsy", Epilepsia, 1-4, 2014

Scott, K. A. et al., "The-combination-of-cannabidiol-and-9-tetrahydrocannabinol-enhances-the-anticancer-effects-of-radiation" Mol Cancer Ther 2014 Dec. 14; 13(12):2955-67.

Alline C., et al., "The anxiolytic effect of cannabidiol on chronically stressed mice depends on hippocampal neurogenesis: involvement of the endocannabinoid system", The International Journal of Neuropsychopharmacology/Volume 16/Issue 06/July 2013, pp 1407-1419.

Xapelli S., et al. "Activation of Type 1 Cannabinoid Receptor (CB1R) Promotes Neurogenesis in Murine Subventricular Zone Cell Cultures" May 21, 2013 PLOS 1.

Jiang, W. et al., "Cannabinoids promote embryonic and adult hippocampus neurogenesis and produce anxiolytic-and antidepressant-like effects" J Clin Invest. 2005; 115(11): 3104-3116.

Kempker, J. A. et al., "The Effects of Marijuana Exposure on Expiratory Airflow. A Study of Adults who Participated in the U.S. National Health and Nutrition Examination Study." Ann Am Thomas, A. A. et al., "Association Between Cannabis Use and the Risk of Bladder Cancer: Results From the California Men's Health Study." Urology, Vol. 85, Iss. 2, 2015.

Gaoni, Y. et al., "Isolation, structure and partial synthesis of an active constitutent of hashish." J. Amer. Chem. Soc. 86, 1646-1647 (1964).

Glass, M. et al. "Cannabinoid Receptors in the Human Brain: A Detailed Anatomical and Quantitative Autoradiographic Study in the Fetal, Neonatal and Adult Human Brain." Neuroscience Vol. 77, No. 2, pp 299-318, 1997.

Van der Stelt, M. et al., "Neuroprotection by Δ9-Tetrahydrocannabinol, the Main Active Compound in Marijuana, against Ouabain-Induced In Vivo Excitotoxicity" The Journal of Neuroscience, 2001, 21(17); 6475-6479.

Barnes, M. P., "Sativex: clinical efficacy and tolerability in the treatment of symptoms of multiple sclerosis and neuropathic pain." Expert Opin Pharmacother. 2006 April; 7(5):607-15 Perras C., "Sativex for the management of multiple sclerosis symptoms", Issues Emerg Health Technol. 2005 September; (72):1-4.

Massi P. et al., "Cannabidiol as potential anticancer drug." J. Clin Pharmacol. 2013 February; 75(2): 303-12.

Romano, B. et al., "Inhibition of colon carcinogenesis by a standardized Cannabis sativa extract with high content of cannabidiol." Phytomedicine. Volume 21, Issue 5, 15 Apr. 2014, Pages 631-639.

Gaoni, Y., et al."Cannabichromene, a new active principle in hashish". Chemical Communications 1: 20-1. 1966.

Turner C. E. et al., "Biological activity of cannabichromene, its homologs and isomers." J Clin Pharmacol. 1981 August-September; 21(8-9 Suppl):283S-291S.

Brown, N K., et al., "In vitro metabolism of cannabichromene in seven common laboratory animals." Drug Metab Dispos. 1990 November-December; 18(6):1065-70.

Shinjyo, N. et al.," The effect of cannabichromene on adult neural stem/progenitor cells." Neurochemistry International. Volume 63, Issue 5, November 2013, Pages 432-437 Life Sci. 1999; 65(6-7):573-95.

Discovery and characterization of endogenous cannabinoids. Martin B R1, Mechoulam R, Razdan R K.

Hepler R. S et al. "Marihuana smoking and intraocular pressure," JAMA, 1971 Sep. 6; 217(10):1392.

Lachenmeier et al. "Comparative risk assessment of alcohol, tobacco, cannabis and other illicit drugs using the margin of exposure approach. Scientific Reports 5, Article No. 8126.

Amada et al. "Cannahidivarin (CBDV) suppresses pentylenetetrazole (PTZ)-induced increases in epilepsy-related gene expression. PeerJ.1:e214; DOI 10.7717/peerj.214.

Haney M. et al. Dronabinol and marijuana in HIV-positive marijuana smokers. Caloric intake, mood, and sleep. Acquir Immune Delis:. Synth. 2007 Aug. 15; 45(5):545-54.

Eubanks, L. M. et al. A Molecular Link Between the Active Component of Marijuana and Alzheimer's Disease Pathology. Mol Pharm. 2006; 3(6): 773-777.

BRIEF SUMMARY OF THE INVENTION

Accordingly, an object of the present invention is to provide a method for extracting plant oils, specifically CBNs, from plant tissue using ethanol and water.

Another object of the present invention is to provide a method to produce a concentrated tincture of plant oils, specifically of CBNs, by using an advantageous azeotrope of ethanol and water.

Another object of the present invention is to provide a method to produce a concentrated tincture of CBNs by using the differing solubility of cannabinoids in ethanol and water to drive oil formation.

Another object of the present invention is to provide a method to produce a concentrated tincture of CBNs in ethanol by adding water as an anti-solvent to a dilute ethanolic solution of plant oils.

Another object of the present invention is to provide a method for extracting CBNs from plant tissue in a continuous fashion.

Another object of the present invention is to provide a method of extracting CBNs that results in a non-toxic tincture using ethanol and water.

Another object of the present invention is to provide a method of extracting CBNs that can be run on all manufacturing scales, from a home appliance for small quantities, to the hundreds of kilos for commercial production.

Another object of the present invention is to provide a method of extracting CBNs that can be run following cGMP manufacturing standards.

Another object of the present invention is to provide a method of extracting CBNs that can be modulated to preferentially extract CBNs of greater or lesser polarity.

Another object of the present invention is to provide a method for extracting CBNs from plant tissue that eliminates any flammability hazards.

Another object of the present invention is to provide a method for low temperature extraction of CBNs from plant tissue enabling less ballast contamination and more intact plant oils.

Another object of the present invention is to provide a rapid and efficient method for extracting CBNs from plant tissue.

Another object of the present invention is to provide a method for extracting CBNs from plant tissue which can take advantage of pre-processing the plant tissue in other locations.

Another object of the present invention is to provide a method of extracting plants oils, and specifically CBNs, from plant tissue using cartridges made from hemp fiber.

Another object of the present invention is to provide a method for extracting CBNs from plant tissue using ethanol water in a continuous fashion by distilling an aqueous ethanol solution, passing the distillate through plant material, reintroducing the obtained extract to the distillation pot, adding food oils or butter to the distillation pot, then collecting the second phase plant oil as an extract in the food oil or butter.

The present invention achieves its objects by providing methods of extracting CBNs from plant tissue using ethanol and water. The manners in which the invention achieves its objects and other objects which are inherent in the invention will become more readily apparent when reference is made to the accompanying drawings.

BRIEF DESCRIPTION OF THE DRAWINGS

The above and other objects and features of the invention will become apparent from the following description, when taken in conjunction with the accompanying drawings wherein.

DETAILED DESCRIPTION OF THE INVENTION

Figure 1:
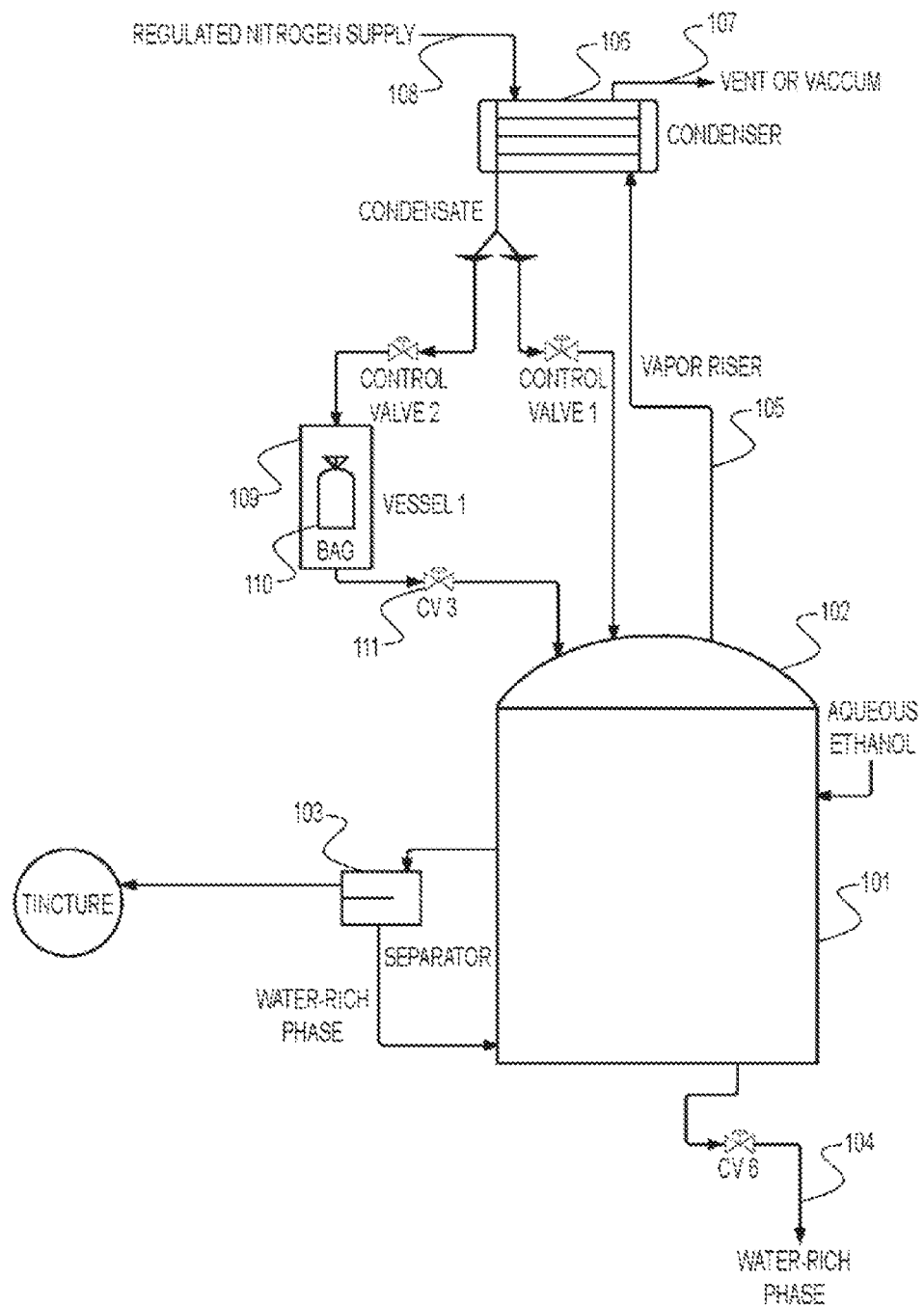
FIG. 1 is a schematic representation of the semi-continuous CBNs extraction system.

Referring now to the drawings wherein the showings are for purposes of illustrating a preferred embodiment of the invention and not for purposes of limiting the same, A first embodiment of the invention is a semi-continuous Extraction System 100, detailed in FIG. 1 where the system is fabricated from stainless steel, glass or any other suitable material and is composed of a 20 L boiling pot 101 that in other embodiments may be larger or smaller in volume. The boiling pot 101 is disposed with a vented lid 102. In this embodiment the vented lid 102 is also disposed with ports (not shown) for return flow. In this embodiment the boiling pot 101 is also disposed with side-ports (not shown) for attachment of a separator 103 and with a drain 104. The boiling pot 101 may be filled with ethanol and water at any ratio below 95:5. Applying heat to boiling pot 101 produces a 95% ethanol/water azeotrope that escapes from the vented lid 102 and enters the input end of a distillation column 105. The 95% ethanol azeotrope is constant and absolute as long as the boiling pot 101 has enough ethanol. In some embodiments an intermediate region of the distillation column 105 may contain packing material (not shown) to prevent boil up of solvent and oil from the boiling pot 101. Distilled ethanol water vapor passes through the output end of the distillation column 105 into the input end of a condenser 106 where it returns to the liquid phase. In this embodiment the condenser can cool the distillate stream to −10° C. but in other embodiments could cool the distillate stream all the way to the freezing point of 95% ethanol water, −144° C. Lower temperature 95% ethanol water reduces the extraction of wax, chlorophyll and other ballast material. Lower temperatures also reduce denaturing and damage to the extracted compounds caused by ethanol. In some embodiments a vent or vacuum 107 may be attached to the condenser 106 to reduce pressure and further lower temperatures within the extraction system 100. In other embodiments the vent or vacuum 107 may be disposed at other points in the system. In yet further embodiments, a regulated nitrogen supply 108 may be used to introduce $N_2$ gas into the system through the condenser 106 reducing the risk of fire and enhancing safety. In other embodiments the N2 gas may be introduced at other points within the extraction system 100. Numerous valves 111 are disposed throughout the system 100 to enable control over flow from one component to the next.

Chilled ethanol water condensate is passed through the output end of the condenser 106 and into the input end of a vessel 109. In this embodiment the vessel 109 contains one half pound of plant tissue, preferably *cannabis* flower tissue, but other plants and tissues may be used. In other embodiments the capacity of vessel 109 may be greater or smaller in volume so that other amounts of plant tissue may be used. Vessel 109 may also contain a disposable cartridge or filter bag 110 with mesh sized to retain plant tissue and further enabling pre-loading of plant tissue into bags 110 off-site to increase efficiency. In a preferred embodiment, cartridges 110 are made from hemp fiber.

In the preferred embodiment chilled 95% ethanol water commingles with *cannabis* flower tissue inside of the vessel 109. CBNs have good solubility in 5% aqueous ethanol and are extracted with high efficiency from the plant tissue to a concentration >200 mg/ml. The resulting extract contains primarily CBNs but also other components soluble in this solvent such as chloroplasts. In the preferred embodiment the extract from vessel 109 is introduced back into the boiling pot 101, or refluxed, but in other embodiments may be collected in another collection pot. Excess water in boiling pot 101 acts as an anti-solvent taking ethanol and water back from the extracted oil and driving the formation of a distinct upper oil layer overlying the lower ethanol water layer (not shown). In a smaller scale extraction embodiment the process is stopped when the plant tissue in vessel 109 is exhausted or alternately when the ethanol water becomes too green from collected chloroplasts and debris. The heat is turned off, the boiling tank allowed to settle, and then the lower ethanol water phase drawn off using drain 104. After the lower ethanol water phase is removed, the upper oil phase can be drawn off using the same drain 104. In larger scale extraction embodiments the oil layer is recovered from the boiling pot 101 by means of the separator 103 that draws off the upper oil phase and returns any excess ethanol and water to the boiling pot 101. In yet a further embodiment adding food oil, such as but not limited to vegetable oils, rendered animal fat or butter, to the boiling pot 101 will collect the oil layer.

Figure 2:
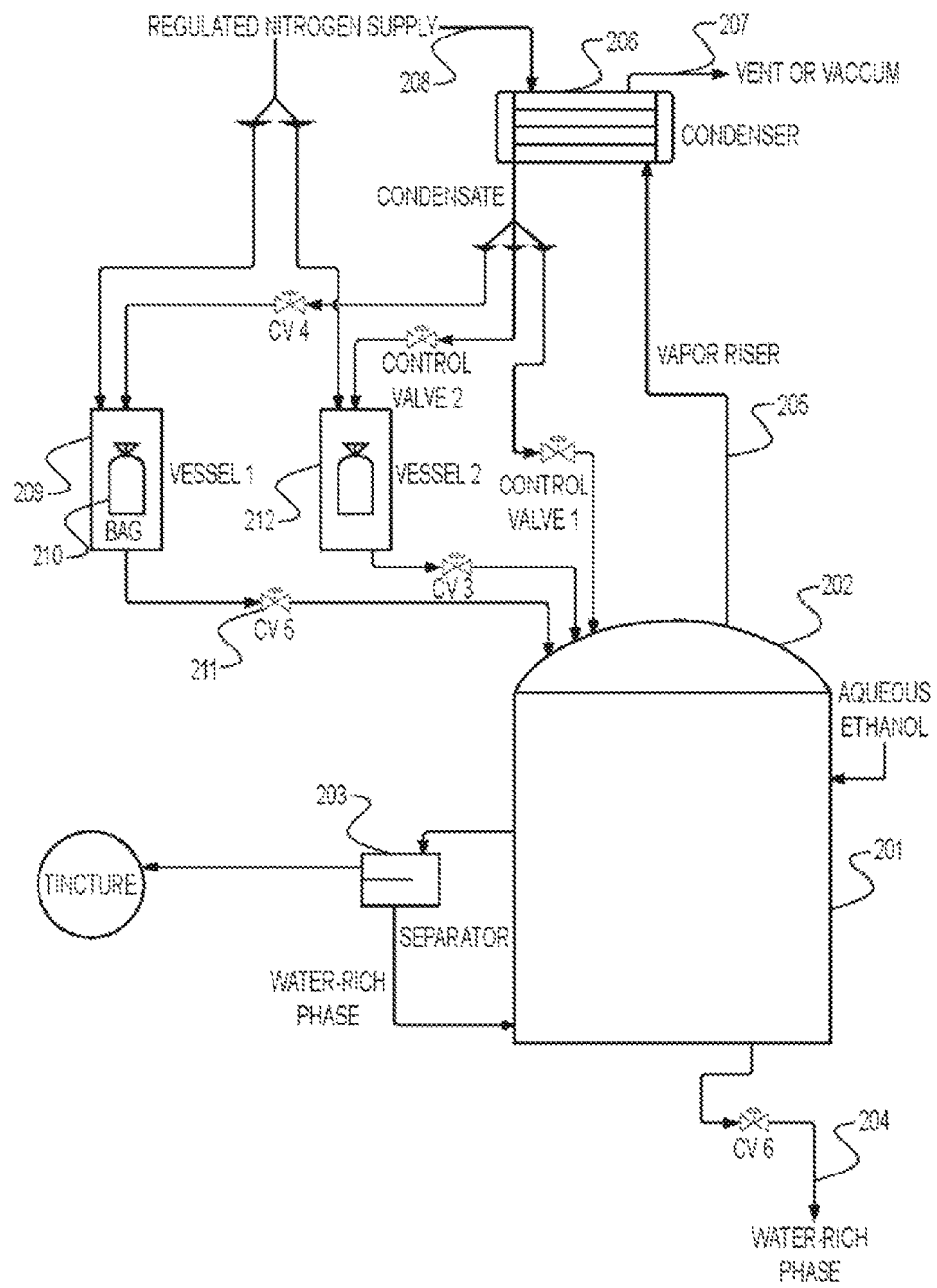
FIG. 2 is a schematic representation of the continuous CBNs extraction system.

A second embodiment is a continuous Extraction System 200, (FIG. 2). A continuous process entails using at least two and in some embodiments a multiplicity of vessels 209 containing oil bearing plant tissue. When the plant tissue in vessel 209 is exhausted, the necessary control valves 211 are opened and closed so that condensate passes through vessel 212 containing fresh plant material. Vessel 209 can be emptied of spent plant tissue and then replenished with fresh plant material while the train is set to extract from vessel 212. In one embodiment spent plant material can be used for other purposes and will be stored for resale. As long as fresh plant matter is supplied to the system, ethanol and/or water are replenished to maintain the desired composition in the boiling pot 201, chloroplasts and other cellular debris are removed from the bottom of boiling pot 201, the process can be run indefinitely. In a further embodiment, added food oil, such as but not limited to vegetable oils, rendered animal fat or butter, to the boiling pot 201 will collect the oil layer. In yet further embodiments the extracted CBNs can be selectively fractionated by varying the pH and concentration of water in the boiling pot 201.

It will be understood that various modifications can be made to the various embodiments of the invention herein disclosed without departing from the spirit and scope thereof. Therefore, the above description should not be construed as limiting the invention, but merely as an exemplification of preferred embodiments thereof. Those of skill in the art will envision other modifications within the scope and spirit of the invention as defined by the claims appended hereto.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method of extracting oil from plant tissue comprising:
   a. The step consisting of mixing ethanol and water in a ratio less than or equal to 95% ethanol in a boiling pot;
   b. The step consisting of distilling 95% ethanol from said boiling pot;

c. The step consisting of commingling said 95% ethanol with an oil-bearing plant tissue in an extraction chamber;
d. The step consisting of collecting an oil-bearing ethanol in said boiling pot;
e. The step consisting of removing said oil-bearing ethanol from said boiling pot to a separator;
f. The step consisting of separating an oil from an aqueous phase by a separator that draws off an upper oil phase;
g. The step consisting of returning said separated aqueous phase to said boiling pot;
h. The step consisting of repeating steps a-g without stopping the extraction process.

2. The method of claim 1 further comprising the step of replenishing oil-bearing plant tissue in said extraction chamber by switching a distillate flow to a further extraction chamber.

3. The method of claim 2 further comprising the step of replenishing said boiling pot with ethanol and water.

4. The method of claim 3 further comprising the step of removing a debris from said boiling pot.

5. The method of claim 4 further comprising the step of removing said oil from said separator.

6. The method of claim 5 further comprising the step of chilling said 95% ethanol to a temperature not lower than −144° C. prior to reaching said extraction chamber.

7. The method of claim 6 further comprising the step of reducing the pressure within the system.

\* \* \* \* \*